United States Patent Office 3,037,187
Patented May 29, 1962

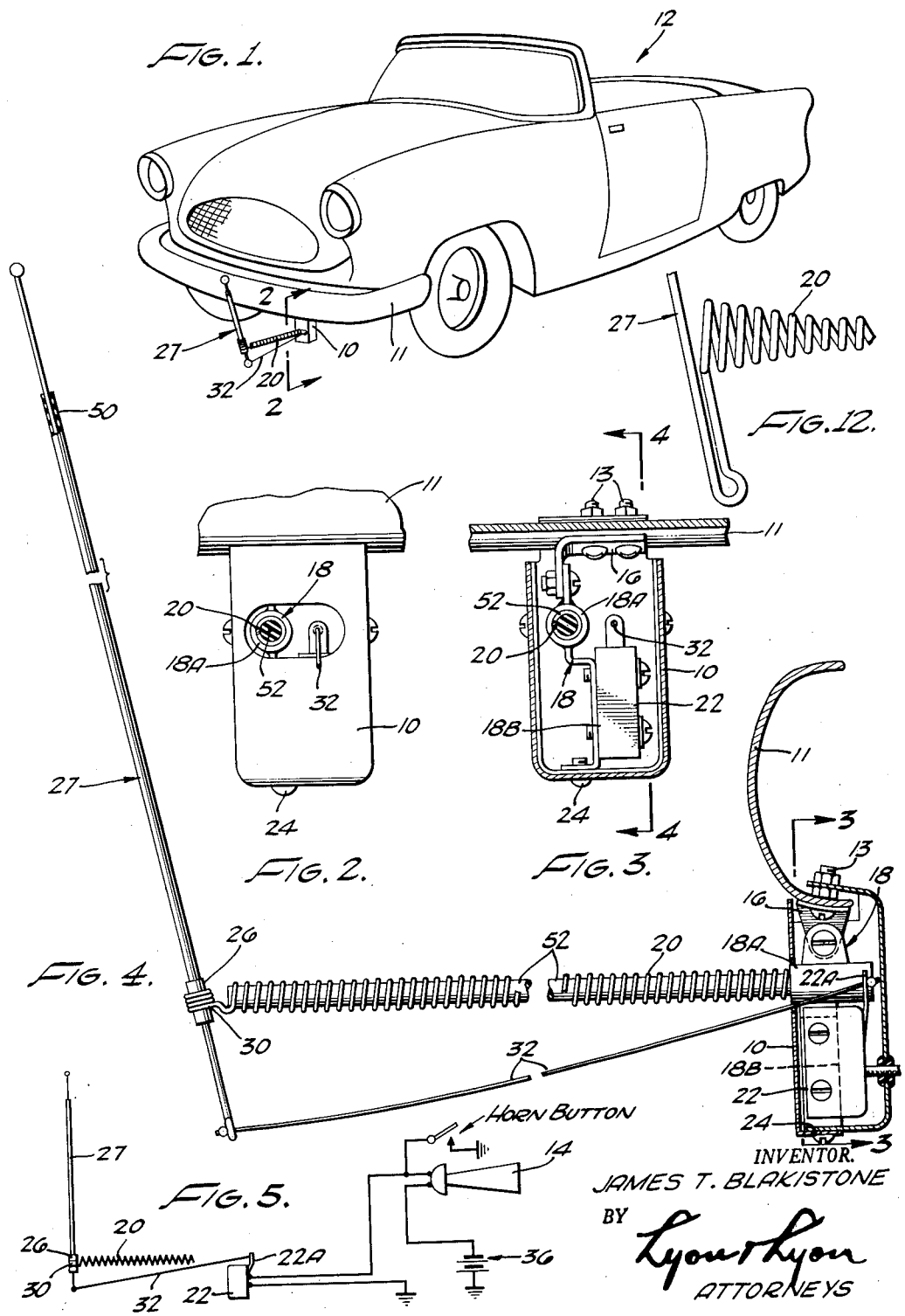

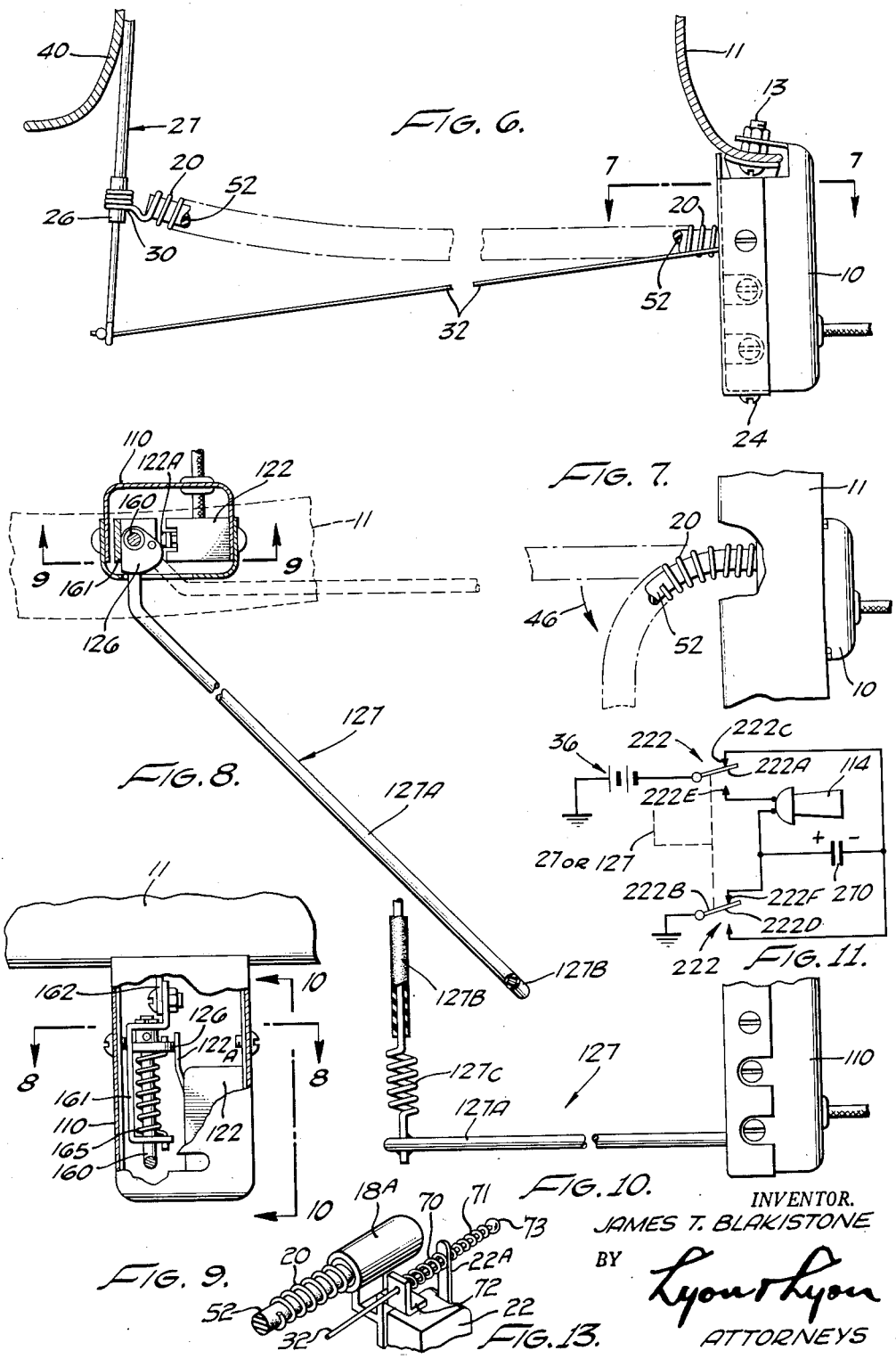

3,037,187
AUTOMOBILE SIGNALLING SYSTEM
James T. Blakistone, 700 E. Huntington Drive,
Alhambra, Calif.
Filed Feb. 10, 1958, Ser. No. 714,172
15 Claims. (Cl. 340—61)

The present invention relates to signalling arrangements for use on an automobile for producing an indication, such as by sounding its horn when it happens to be too close relative to other bodies, such as another automobile; and in particular to an arrangement for mounting on small cars of the foreign or sports car type that have bumpers which are positioned lower than bumpers on conventional domestic automobiles. The present application is a continuation-in-part of my copending application Serial No. 692,842 filed October 28, 1957.

Much damage has heretofore been caused to the grilles and bodies of sports and foreign cars in the process of parking a conventional domestic automobile next to it as a result of the fact that such cars are relatively small and their bumpers are lower than the bumpers of the conventional domestic automobile, i.e., the bumpers do not "match" in height. The likelihood of such damage is increased markedly by the fact that a parked foreign or sports car is not readily visible to a person parking a conventional automobile in the process of backing into an adjacent space, when using his rear vision mirror. The likelihood of damage is further present upon consideration of the fact that many drivers of conventional automobiles do not realize that the bumpers on their automobiles do not "match" in height and even should they see the foreign car, attempt to have the bumpers of their automobiles touch gently the sports car bumpers, either in gauging distances or in an attempt to facilitate their parking operations. Consequently, many sports and foreign cars have been needlessly damaged at the cost of much time and money.

While the present arrangements are particularly useful in protecting small foreign and sports cars from damage, they may likewise be used on commercial domestic automobiles and installed thereon for the same purpose. In this respect, it will be observed that the signals are produced should there be contact between domestic automobiles having "matching" bumpers.

It is, therefore, an object of the present invention to provide improved signalling devices particularly useful in protecting small foreign and sports cars from damage.

Another object of the present invention is to provide signalling devices of this character which are operated only under the desired condition in which an automobile having a higher bumper is adjacent thereto and not necessarily either when the sports car is being driven, or when the driver of the sports car parks his car adjacent a wall such as the wall of his garage.

Another object of the present invention is to provide a signalling device of this character which is actuated in accordance, not necessarily in accordance with the proximity of a neighboring body, but in accordance with the differences in height.

Another object of the present invention is to provide an arrangement of this character which may be sold in a compact assembly that may be easily mounted on a sports car.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is a perspective view showing a sports car having a signalling arrangement embodying features of the present invention mounted thereon.

FIGURE 2 is a sectional view of the line 2—2 of FIG. 1.

FIGURE 3 is a sectional view on line 3—3 of FIGURE 4.

FIGURE 4 is a sectional view on line 4—4 of FIGURE 3.

FIGURE 5 shows electrical connections of the signalling arrangement used in FIGURE 4 and FIGURE 9.

FIGURE 7 is a view taken in the general direction indicated by lines 7—7 in FIGURE 6 and serves to illustrate one way in which the resilient supporting arm may be deflected without producing a signal.

FIGURES 8–10 show a modified arrangement, FIGURES 9 and 10 being views taken along the lines 8—8 and 10—10, respectively, in FIGURE 9 and FIGURE 9 being a view taken along the line 9—9 in FIGURE 8.

FIGURE 11 is a modified circuit arrangement in which the switch shown therein and associated electrical wiring is substituted for the corresponding switch and wiring in eiher FIG. 4 or FIG. 9; i.e., FIGURE 11 is a modification of FIGURE 5.

FIGURE 12 shows a modified arrangement.
FIGURE 13 illustrates a preferred arrangement.

Referring to the arrangement shown in FIGURES 1–7, an assembly of elements is mounted on the casing 10 and such casing 10 is clamped on the lower edge of the front bumper 11 of the sports car 12 at a convenient location by means of a pair of bolts 13. A like arrangement may also be mounted in like manner on the rear bumper for energization of the same conventional horn 14 (FIGURE 5) with which the car is already equipped.

The casing 10 comprises a sheet metal housing in which is secured the bracket 16 by the same bolts 13. This bracket 16 as shown in FIGURE 3 has secured thereto a second bracket 18 which includes a tubular portion 18A that snugly receives and retains one end of spring 20 which extends forwardly through an apertured portion of casing 10. The bracket 18 also includes a straight portion 18B on which is mounted the small normally open single pole single throw switch 22. The lower end of bracket 18 is secured to the casing 10 by the screw 24.

The forward end of the spring 20 is so formed that the wire of which it is made is wrapped around a sleeve 26 on the wand 27 at the region 30 to normally maintain the wand 27 in the position shown in FIG. 4 wherein the axis of the wand is inclined upwardly and forwardly. The region 30 comprises a pivot point for the wand for achieving important features of the present invention.

The lower end of the wand 27 is formed as an eyelet through which one end of the switch actuating cord 32 passes. The other end of the cord 32 passes through an apertured portion in the switch actuating member 22A and the ends of such cord 32 are provided with suitable enlargements to retain it between the wand 27 and switch actuating member 22A. This cord 32 is preferably in the form of a chain or other element which serves to transmit tension forces and is thus referred to as a non-compressible tension element although it has been found in practice that a small diameter loose wire will serve the same purpose.

The normally open single pole-single throw switch 22 is connected in series with the conventional horn 14 and battery 36 of the car as shown in FIGURE 5.

The wand 27 extends upwardly a sufficient distance so that it may be contracted and moved by the bumper of a conventional domestic automobile which has its bumper in "non matching" relationship to the sports car bumper; and, indeed, such wand 27 may also be contacted and moved in like manner by the bumper of a like sports car having "matching" bumpers as now described in relationship to FIGURE 6.

When wand 27 is contacted by the bumper 40 as shown in FIGURE 6, the wand 27 pivots about the pivot point or region 30 defined by the end of spring 20 so that the lower end of the wand 27 exerts a pull on tension force on the tension member 32 to cause the switch 22 (FIGURES 4 and 5) to be closed to thereby energize the horn 14 and create a warning sound to warn the driver of the automobile having the bumper 40 that his automobile is being moved too close to the sports car. In this case, the horn will continue to be sounded so long as the bumper 40 is in the position shown in FIGURE 6.

It will thus be seen from this construction that the cantilever supported spring 20 can move back and out of harm's way as indicated by arrow 46 in FIGURE 7 when the sports car is driven close to a flat wall, such as the wall of a garage, or other obstruction, without damaging and without sounding the horn. The horn is not sounded since, in such case, there is no pivotal movement of the wand 27 about the pivot point 30 of such extent and direction to tension sufficiently the tension member 32.

In other words, the pivot point 30 at the end of the spring 20 is below the level of expected contacts so that the lever and fulcrum action required for sounding of the horn is possible only with a special type of contact at predetermined high levels. By this construction, the arrangement is made selective to contacts of a particular type above a certain level.

If desired, the wand 27 which is a metal rod may be covered throughout its length of expected contact, with anti friction material such as rubber sleeve 50 to assure non-sliding of the wand when contacted by the metal bumpers of automobiles or sports cars.

Further, if desired, stiffening of the cantilever supported spring 20 may be provided by insertion of a flexible tube 52 inside the convolutions of the spring 20 to assure non sounding of the horn under vibration conditions particularly when the sports car is being driven over bumpy roads.

The spring 20 may be of spring wire having a diameter of .090° and is stiff enough to limit its oscillations in the vertical plane for driving conditions. The force required to actuate the switch is large enough so that the "whipping" of the spring is insufficient to trip the switch under ordinary rough road conditions. This spring is also designed to develop sufficient force to trip the switch even though the wand is pushed back at an angle with respect to the axis of the supporting spring. Under these conditions, as for example when a car is being moved into a front parking space at an angle, the spring tends to move laterally but it resists this motion. Pivoting action of the spring still occurs and the switch is tripped. Preferably the element 32 is a stainless steel stranded wire having a test strength of 40 pounds and cylindrical enlargements are switched on the ends of such wire 32 as shown in FIGURE 4.

It will be noted that in cars that have horns operated through relays, the structure is such that the switch energized the relay rather than the horn directly.

Further, it will be noted that the arrangement serves as a warning device to warn the owner of the car when he is parking or in too close proximity to another object.

In the modified arrangement shown in FIGURE 12, the wand 27 is formed as an integral extension of the forward end of the spring as shown in this figure, it being noted that in FIGURE 12, the wand 27 as in the previous figures is in the form of a rod and that it has a U-bend at its lower end and the shorter leg of the U-bend is an integrally formed extension of the end of the spring 20 which has convolutions of increasing diameter at the fulcrum point 30. In FIGURE 12, the entire spring and integrally formed wand may be coated with Vinylite, accomplished by dipping in a Vinylite solution and then allowing the Vinylite to harden. The Vinylite, in such cases, serves as an anti-friction means for the wand portion and serves to also "stiffen" or "dampen" movement of the spring.

It will be observed that the opposing forces of the switch loading spring which is inherent in the switch construction or which may be provided as a supplemental spring, and the forces developed by the vertical oscillation of the main spring 20, due to whipping action, bear the relation in magnitude to each other that whipping of the spring in the vertical plane (even under resonant conditions) is such that the mechanism will produce an indication only by pivoting action about the fulcrum point 30 and not by such whipping action.

It will be observed that the spring 20 has its axis extending below the bumper on which the arrangement is attached so that the pivot point is below the level of the expected bumper contacts. By virtue of this arrangement, signals will be produced upon contact with a car of "matching" bumpers.

Further, it will be noted that with this construction, the switch actuating member 22A is positioned very close to the cylindrical bracket portion 18 which is the point of support for the cantilever spring 20 so that there is the least tendency for the switch to be actuated in response to vibration of the free end of the spring 20 in the vertical plane of the spring; i.e., vibration of the pivot of fulcrum point 30. In other words, to achieve this result, the center of bending of the spring 20 and the center of radius of the actuating element 32 are very close to each other.

In the modified arrangement shown in FIGURES 8–10, the normally open single pole-single throw switch 122 is cam operated by a pivoted rigid wand 127. The wand 127 is pivotally mounted on a shaft 160 which passes through spaced apertured portions of the bracket 161 and is retained thereon. This bracket 161 is in turn secured to the bracket 162 which together with casing 110 is secured to the bumper 11 in like manner as in the previous figures.

The wand 127 carries a cam 126 which is normally out of engagement with the switch actuating member 122A of switch 122 by the torsion spring 165 that has one of its ends secured to bracket 161 and the other one of its ends fastened to the cam 126. The wand 127 has a horizontal portion 127A and a vertical portion 127B at the end thereof. The wand portions 127A and 127B are interconnected by a coil spring 127C so as to provide a resilient connection between the elements 127A and 127B. This connection 127C is sufficiently strong to impart movement of the wand portion 127A upon normal contact force being applied to the wand 127B. However, should the wand portion 127B be restrained from movement as for example, upon being restrained from movement by a protrusion on a bumper, then the spring 127C is flexed so as to avoid harm to the portions 127A and the switch.

Thus, when the wand portion 127B is contacted and moved by an automobile bumper, the wand is pivoted in a counterclockwise direction about shaft 160 from its normal position shown in FIGURE 8 to cause the switch 122 to be closed and the horn 14 to be sounded.

For these purposes, it is noted that the shaft 160 or pivoting axis extends vertically, the wand portion 127B extends vertically and the wand portion 127A has its axis extending generally horizontally and inclined with respect to the longitudinal axis of the car having bumper 11.

In both of the arrangements previously described, the horn continued to be sounded when the switch 22 or 122 is maintained in its actuated position. The circuitry shown in FIGURE 11 provides, however, for only a single blast of the horn such that the horn is prevented from being continuously sounded when an automobile or car is maintained too close to the actuating wand. It will be understood that the switch 222, of the double pole-double throw type and its associated wiring is substituted for either switch 22 or 122 and its associated wiring in these modifications.

In FIGURE 11, the ungrounded terminal of battery 36 is normally connected to one movable switch arm 222A of switch 222 having its normally closed stationary contact 222C connected to the terminal, marked negative, of the non polarized electrolytic condenser 270 of approximately 500 microfarads and also to the normally open stationary contact 222D of the other switch half. The other normally open stationary contact 222E is connected to one terminal of a signalling device such as horn 114 which has its other terminal connected to the terminal, marked positive, of condenser 270 and also to the stationary normally closed contact 222F. The other movable switch arm 222B is grounded. Both switch arms 222A, 222B are operated together by either wand 27 or 127 as previously explained.

Thus, in FIG. 11, normally the condenser 270 is being charged to establish a precharge therein, through the charging circuit which includes battery 36, contact 222C, condenser 270, contact 222F and the grounded switch arm 222B. Such condenser 270, thus precharged, is allowed to discharge through the horn 114 when the switch 222 is operated either by wand 27 or 127 to its other position; and in such case, the condenser 270 discharges through a circuit which includes the condenser 270, the horn 114, contact 222E, arm 222A, battery 36 and switch arm 222B. In such case, there will be a momentary sounding of the horn since the condenser is connected in series with the horn and the battery and energizing current will flow through the horn until the voltage in the condenser drops from the load, after which further power to the horn is interrupted due to the blocking action of the condenser.

In the preferred arrangement shown in FIGURE 13, a pair of springs 70 and 71 are used to prevent movement of the movable switch element 22A under conditions where the wand 27 is subjected to vibration when, for example, travelling over rough roads. The springs 70 and 71 are coil compression springs and each are axially aligned with the tension member or wire 32 passing therethrough. The spring 70 has one of its ends abutting the apertured bracket 72 on the housing of switch 22, the other end of spring 70 bears against the switch actuating arm 22A. The other spring 71 has one of its ends abutting the switch actuating arm 22A, the other end of spring 71 bearing against the abutment 73, shown as a ball, on the wire 32.

In general, the spring 70 resiliently holds the switch arm 22A away from its actuated position and the spring 71 is thus required to be compressed to a degree before the switch arm 22A is moved to its actuated position against the force exerted by spring 70. Spring 70 is relatively "strong" in relationship to spring 71; i.e., a greater force is required to be applied to the spring 70 to cause it to move the same distance which the spring 71 is moved with the same force applied thereto. Thus, vibratory forces transmitted from the wand to the tension member 32 may be absorbed by the spring 71 without moving the arm 22A to its actuated position. A more positive and greater force is required to move the arm 22A to its actuated position; and when such force is applied as, for example, when the wand 27 is contacted by the bumper of a neighboring car, the spring 71 is partially compressed to such a degree as to move the arm 22A to its actuated position against the force of spring 70.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. In a signalling arrangement for use on vehicles comprising, a switch including a housing therefor, means for attaching said housing to a bumper of a vehicle, a coil spring having one of its ends supported as a cantilever at a point on said housing and extending outwardly therefrom, said switch having a switch actuating member located in close proximity to said point on said housing, a bumper engaging wand extending generally vertically and having an intermediate portion thereof secured to the free end of said cantilever coil spring at a fulcrum point about which said wand may fulcrum, the lower end of said wand extending below said fulcrum point, and a substantially non compressible tension element interconnecting said lower end to said switch actuating member.

2. In a signalling arrangement for use on a vehicle having a bumper that is of lower level than bumpers of conventional domestic vehicles, the combination comprising, a housing, means for mounting said housing on a bumper of said vehicles, a switch including an actuating member therefor mounted in said housing, a coil spring having one of its ends affixed to said housing at a support point and extending outwardly therefrom as a cantilever supported coil spring with a free end, a wand extending generally upwardly and forwardly of said vehicle, said wand extending upwardly beyond the level of said bumper and being covered with anti friction material, said free end of said coil spring having a portion of its free end connected to an intermediate portion of said wand and providing a fulcrum point about which said wand may pivot in the immediate vicinity of said free end, said coil spring having means associated therewith for imparting increased resistance to flexing of said spring, said wand having a lower portion extending below said fulcrum point, a non-compressible tensile member interconnecting said lower member being positioned in the immediate vicinity of said spring support point.

3. In a signalling arrangement for use on a vehicle having a bumper that is of lower level than bumpers of conventional domestic vehicles, the combination comprising, a housing, means for mounting said housing on said bumper, a switch including an actuating member therefor mounted in said housing, a wand extending generally upwardly beyond the level of said bumper for engagement and pivotal movement by a bumper of another vehicle, means pivotally mounting said wand with respect to said casing such that said wand undergoes pivotal movement upon its engagement and movement by said bumper of another vehicle, means responsive to said pivotal movement of said wand for operating said actuating member, a horn, a battery, and circuit means interconnecting said switch, horn and battery such that said horn is sounded upon operation of said actuating member, said pivotally mounting means including a cantilever spring having one of its ends affixed to said housing and the other one of its ends securing said wand.

4. An arrangement as set forth in claim 3 in which said cantilever spring has its axis extending below the bumper on which it is mounted.

5. In a signalling arrangement for use on vehicles comprising, a switch including a housing therefor, means for attaching said housing to a vehicle, a wand mounted on said housing and having a vertically extended portion which extends vertically an appreciable distance above the level of the bumper of the vehicle on which it is mounted, means pivotally mounting said wand with respect to said housing such that said wand is pivoted by engagement and movement of the bumper of another vehicle, said switch having an actuating member, a substantially non compressible tension element having one of its ends attached to said wand, a first compression spring between the other end of said tension element and said switch actuating member, bracket means on said housing, and a second compression spring between said bracket means and said switch actuating member.

6. In a signalling arrangement for use on vehicles comprising, a movable sensing element, means mounting said sensing element on a vehicle, a switch having an actuating element, a tension member having one of its ends attached to said sensing element, said tension element passing through apertured portion of said switch actuating member, a first coil spring between the other end of said tension element and said switch actuating member, said switch having a housing, a second coil compression spring acting between said switch actuating member and said housing, said first and second springs being axially aligned and having said tension element passing therethrough, the second spring being stronger than the first spring.

7. In a signalling arrangement for use on a vehicle having a bumper that is of lower level than bumpers of conventional domestic vehicles, the combination comprising, a housing, means for mounting said housing on said bumper, a switch including an actuating member therefor mounted in said housing, a wand extending generally upwardly beyond the level of said bumper for engagement and pivotal movement by a bumper of another vehicle, means pivotally mounting said wand with respect to said casing such that said wand undergoes pivotal movement upon its engagement and movement by said bumper of another vehicle, means responsive to said pivotal movement of said wand for operating said actuating member, a horn, a battery, and circuit means interconnecting said switch, horn and battery such that said horn is sounded upon operation of said actuating member, said circuit means including a condenser, and serving to charge said condenser from said battery, when said wand is in its normal position and serving to discharge said condenser through said horn when said wand undergoes said pivotal movement.

8. In a signalling arrangement for use on vehicles comprising, a switch including a housing therefor, means for attaching said housing to a bumper of a vehicle, a coil spring having one of its ends supported as a cantilever at a point on said housing and extending outwardly therefrom, said switch having a switch actuating member located in close proximity to said point on said housing, a bumper engaging wand extending generally vertically and having an intermediate portion thereof secured to the free end of said cantilever coil spring at a fulcrum point about which said wand may fulcrum, the lower end of said wand extending below said fulcrum point, a substantially non-compressible tension element interconnecting said lower end to said switch actuating member, and a resilient element disposed between said tension element and said switch actuating member for absorbing vibratory forces.

9. In a signalling arrangement for use on vehicles comprising, a switch including a housing, means for attaching said housing to a bumper of a vehicle, a wand extending outwardly from said casing and being movably mounted thereon to extend both outwardly and above said bumper, and means operated upon movement of said wand for operating said switch, said last-mentioned means including a substantially non-compressible tension element having one of its ends attached to said wand, said switch having an actuating member, a first compression spring acting between said switch actuating member and said tension element, and a second compression spring acting between said housing and said switch actuating element.

10. In a signalling arrangement for use on a vehicle having a bumper that is of lower level than bumpers of conventional domestic vehicles, the combination comprising, a housing, means for mounting said housing on said bumper, a switch including an actuating member therefor mounted in said housing, a wand extending generally upwardly beyond the level of said bumper for engagement and pivotal movement by a bumper of another vehicle, means pivotally mounting said wand with respect to said casing such that said wand undergoes pivotal movement upon its engagement and movement by said bumper of another vehicle, means responsive to said pivotal movement of said wand for operating said actuating member, a horn, a battery, circuit means interconnecting said switch, horn and battery such that said horn is sounded upon operation of said actuating member, said pivotally mounting means including a shaft in said housing about which said wand pivots, and cam means on said wand and inside said housing for operating said switch actuating member.

11. In a signalling arrangement for use on a vehicle having a bumper that is of lower level than bumpers of conventional domestic vehicles, the combination comprising, a housing, means for mounting said housing on said bumper, a switch including an actuating member therefor mounted in said housing, a wand extending generally upwardly beyond the level of said bumper for engagement and pivotal movement by a bumper of another vehicle, means pivotally mounting said wand with respect to said casing such that said wand undergoes pivotal movement upon its engagement and movement by said bumper of another vehicle, means responsive to said pivotal movement of said wand for operating said actuating member, a horn, a battery, and circuit means interconnecting said switch, horn and battery such that said horn is sounded upon operation of said actuating member, said circuit means serving to connect said horn, battery and switch in a series circuit, said switch being of the normally open type which is closed by said pivotal movement of said wand to sound said horn.

12. In a signalling arrangement for use on a vehicle having a bumper that is of lower level than bumpers of conventional domestic vehicles, the combination comprising, a housing, means for mounting said housing on said bumper, a switch including an actuating member therefor mounted in said housing, a wand extending generally upwardly beyond the level of said bumper for engagement and pivotal movement by a bumper of another vehicle, means pivotally mounting said wand with respect to said casing such that said wand undergoes pivotal movement upon its engagement and movement by said bumper of another vehicle, and means responsive to said pivotal movement of said wand for operating said actuating member, said pivotally mounting means including a cantilever spring having one of its ends affixed to said housing and the other one of its ends securing said wand.

13. In a signalling arrangement for use on a vehicle having a bumper that is of lower level than bumpers of conventional domestic vehicles, the combination comprising, a housing, means for mounting said housing on said bumper, a switch including an actuating member therefor mounted in said housing, a wand extending generally upwardly beyond the level of said bumper for engagement and pivotal movement by a bumper of another vehicle, means pivotally mounting said wand with respect to said casing such that said wand undergoes pivotal movement upon its engagement and movement by said bumper of another vehicle, means responsive to said pivotal movement of said wand for operating said actuating member, said pivotally mounting means including a shaft in said housing about which said wand pivots, and cam means on said wand and inside said housing for operating said switch actuating member.

14. In a signalling arrangement for use on a vehicle having a bumper that is of lower level than bumpers of conventional domestic vehicles, the combination comprising, a housing, means for mounting said housing on said bumper, a switch including an actuating member therefor mounted in said housing, a wand extending generally upwardly beyond the level of said bumper for engagement and pivotal movement by a bumper of another vehicle, means pivotally mounting said wand with respect to said casing such that said wand undergoes pivotal movement upon its engagement and movement by said bumper of another vehicle, means responsive to said pivotal movement of said wand for operating said actuating member, said switch being of the normally open type which is closed by said pivotal movement of said wand.

15. In a signalling arrangement for use on a vehicle having a bumper that is of lower level than bumpers of conventional domestic vehicles, the combination comprising, a housing, means for mounting said housing on said bumper, a switch including an actuating member therefor mounted in said housing, a wand extending generally upwardly beyond the level of said bumper for engagement and pivotal movement by a bumper of another vehicle, means pivotally mounting said wand with respect to said casing such that said wand undergoes pivotal movement upon its engagement and movement by said bumper of another vehicle, and means responsive to said pivotal movement of said wand for operating said actuating member, said pivotally mounting means including a cantilever spring having one of its ends affixed to said housing and the other one of its ends securing said wand and said cantilever spring having its axis extending below the bumper on which it is mounted.

References Cited in the file of this patent

UNITED STATES PATENTS

| | | |
|---|---|---|
| 2,177,386 | Gearin | Oct. 24, 1939 |
| 2,221,330 | Schneider | Nov. 12, 1940 |
| 2,253,041 | Morse | Aug. 19, 1941 |
| 2,454,896 | Traub | Nov. 30, 1948 |
| 2,808,480 | Baker | Oct. 1, 1957 |
| 2,813,940 | Poet | Nov. 19, 1957 |